Feb. 9, 1960

E. L. PAYNE 2,924,790

MEASUREMENT OF THE MODULATION VOLTAGES
OF A RADIATED HIGH-FREQUENCY CARRIER

Filed Oct. 20, 1954

Inventor
Edwin Levi Payne
By
Attorneys.

United States Patent Office 2,924,790
Patented Feb. 9, 1960

2,924,790

MEASUREMENT OF THE MODULATION VOLTAGES OF A RADIATED HIGH-FREQUENCY CARRIER

Edwin L. Payne, Penrith, Cumberland, England

Application October 20, 1954, Serial No. 463,516

5 Claims. (Cl. 332—39)

This invention relates to improvements in the measurement of the modulation voltages of a radiated high-frequency carrier.

The amplitude of unmodulated high frequency current $a$ in the aerial of a radio transmitter when a modulation low frequency $n$ is superimposed fluctuates between $(a+b)$ and $(a-b)$ known as the modulation ratio where $b$ represents the peak amplitude of the superimposed frequency. This modulation ratio is of great significance in understanding faults in a transmitter.

The power capacity of the transmitter limits $a$, but the strength of the transmitted intelligence is proportional to $b$. Should $b$ exceed $a$, loss in intelligence is the result. This loss can occur before $b$ exceeds $a$, and so it is essential to know the above ratio for all values of $b$ for any given value of $a$. The two values of $b$ are not necessarily equal in amplitude and so should be measured separately.

When the above ratios have been obtained they may be compared to the degree of distortion introduced by such modulation ratios by means of a distortion measuring instrument.

It is an object of the invention to provide a circuit including an electrostatic voltmeter which measures the steady voltage component proportional to the carrier voltage across a resistance and at the same time the modulation voltage across a second resistance according to the peak modulation thereby giving a direct comparison between the amplitude of the radio frequency carrier and the peak amplitude of a modulation voltage, a switch being introduced to measure both positive and negative modulation voltage.

The invention will be described with reference to the accompanying drawings.

Figure 1:
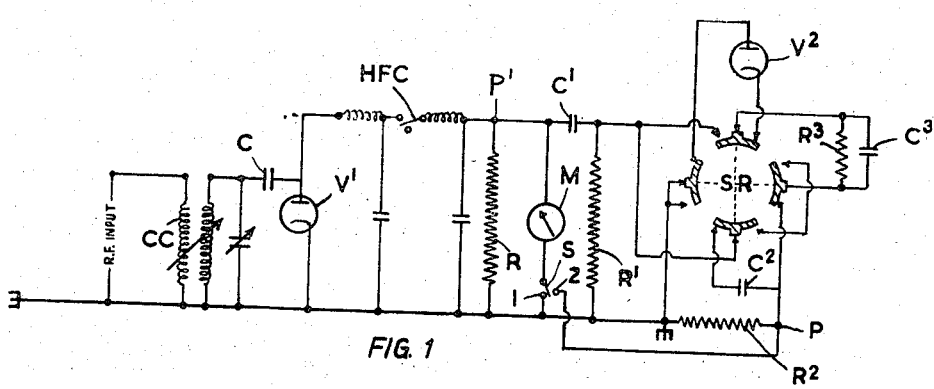
Fig. 1 is a circuit diagram of one embodiment of this invention.

Referring now to Figure 1, the present invention is characterized by two linear half-wave rectifiers $V^1$ and $V^2$ which are coupled insofar as alternating voltages are concerned, but separated insofar as steady voltages are concerned, by a separating capacity $C^1$. A means of applying and accepting an unmodulated or modulated radio frequency carrier is provided to a rectifier $V^1$, together with a means of varying application of the carrier— either by an amplifier or by coupling circuits. A return path for the rectified currents in $V^1$ is provided by a load resistance R.

The electrical time constants of the capacity C—the high-frequency coil HFC—and resistance R circuit should be large compared with the periodic time of the high-frequency signal input but small in comparison with the highest frequency of the modulation likely to be considered.

Under these circumstances the voltages across R will have a steady (D.C.) component due to the peak voltage of the unmodulated carrier, while the variable component is that due to the applied modulation.

In order that this modulation amplitude may be measured it is applied to a second rectifier $V^2$ via the D.C. separating condenser $C^1$ and a resistance $R^1$; rectifier $V^2$ is also provided with a load resistance $R^2$ across which the peak voltages of the variable component are produced, according to the time constant of $R^2$ and charge-discharge capacity of a condenser $C^2$. The second rectifier $V^2$, being a half-wave rectifier, will only register one of the variations of modulation above or below the steady or reference component. As it is desirable that both these modulation peaks should be measured separately, the rectifier $V^2$ is made reversible by a switch S.R. Operation of the switch inverts the rectifier $V^2$ whereby first one peak (Fig. 1) and then the other peak (Fig. 2) of modulation may be ascertained.

Figures 3, 4:
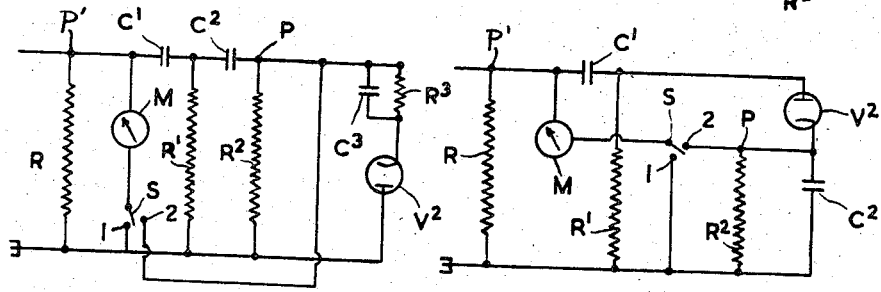
Fig. 3 is a diagram of the rectifier $V^2$ and associated circuit connections shown in Fig. 1.
Fig. 4 is a diagram of the connections of the rectifier $V^2$ shown in Fig. 2.

With the switch S.R. in the position shown in Fig. 1 the connection and disposition of the components of the rectifier $V^2$ are as shown in Fig. 3 and when the switch is rotated counterclockwise, the connections are as shown in Fig. 4, thus in effect inverting the rectifier $V^2$. In use of the meter with switch S.R. in the two positions, first one and then the other peak of modutlaion is developed across the resistance $R^2$.

Figure 2:
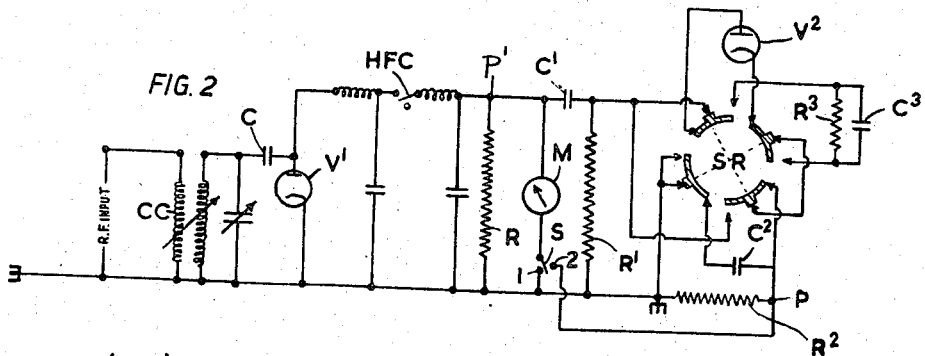
Fig. 2 is the same circuit diagram with the contacts of switch S.R. transferred.

The function of the load resistance $R^3$ and condenser $C^3$ when switch S.R. is in the position shown in Figures 1 and 3 is the same as that of the resistance $R^2$ and condenser $C^2$ when the circuit is switched to the position shown in Figs. 2 and 4. In Figs. 1 and 3 the resistances $R^2$ and $R^3$ and rectifier $V^2$ are in series and in Figs. 2 and 4 the resistances $R^1$ and $R^2$ and rectifier $V^2$ are in series thus preserving the total D.C. resistance of this circuit since the resistance of resistance $R^1$ is equal to the resistance of the resistance $R^3$. The capacity $C^3$ and resistance $R^3$ are necessary in the condition of Figs. 1 and 3 and redundant in the arrangement of Figs. 2 and 4 due to the reversal of the rectifier $V^2$ and consequential re-disposition of the other components.

It has been proposed to measure the voltages across R by means of a direct current meter. The steady voltage due to the rectified high frequency current is a product of this rectified steady current (amperes) and a resistance $Rt$ (ohms) and so this method assumes a constancy of $Rt$, where $Rt$ is the total direct current resistance in series with the rectifier $V^1$.

As this method relies on both this current and $Rt$ being constant for its calibration, any variation in either will result in a standardising voltage across R not being constant and thus cause the modulation factor to be incorrect.

If this steady calibrating voltage across R be measured by a current operated voltmeter, a shunt resistance to R has to be introduced thus increasing the steady current through $V^1$ to obtain the desired standardising voltage across R. In both cases the indicator does only the one operation, that of measuring the steady component of the high frequency carrier, and must remain in situ throughout all measurements, without assurance of accuracy of the standardising voltage.

Similarly for the measurement of the peak value of the alternating component across $R^2$ except that in this case a special voltmeter is used. This voltmeter also only measures the one component, and is again a current operated indicator measuring the response current through a third device (such as a vacuum tube). The accuracy of this vacuum tube voltmeter is dependent on the stability of its components and operating supplies. Any variations in these factors are detrimental, at least, to constant use without calibration or frequent re-calibration of the voltmeter, for which purpose a known and external voltage must be provided.

The present invention eliminates the two previously described methods by using one meter M to measure the steady component across R and at the same time the voltage across R² according to the peak modulation as determined by the switch S.R. thus giving direct comparison between $a$ and $b$. The meter is of the electrostatic type and thus throws no direct-current resistive load across the load resistors R and R², while at the same time measuring the voltage across these resistors and not their respective currents. The vacuum tube operated voltmeter with its calibrating circuits and operating supplies is also eliminated.

A precalibrated electrostatic voltmeter is employed and so arranged that, with an unmodulated high frequency input, it reads the peak voltage across R, and then when the input is modulated, it reads in addition, the peak voltage of that half period of modulation developed across R² as determined by the position of the switch S.R. The meter M is wired (either permanently or by removable connections for transfer purposes) between the positive potential end of the resistance R and the negative potential end P of the resistance R² relative to ground E.

In operation, assume first, an unmodulated high frequency input be applied to rectifier V¹. The meter M will indicate only the steady component of the peak, for being unmodulated, the voltage across V² is zero and the potential of the point P on resistance R¹ is at the potential of the "zero" line E. If now the input is modulated, the meter M will continue to provide the average value of the steady component across R plus the modulation voltage across R², the polarity of which is determined by the position of the switch S.R. If the maximum voltage when modulated be E$m$ and the voltage when unmodulated be E$u$ then (E$m$—E$u$)/E$u$ is the modulation ratio.

When no modulation is present, this expression reduces to (E$m$/E$u$=1) and shows that the modulation factor is zero, i.e., unmodulated; and when E$m$ is twice E$u$, the modulation factor is unity and the modulation factor percentage is 100.

It is known that for high modulation factors the value of E$u$ is reduced. If such reduction is suspected the meter can be transferred to the earth line E via position 1 of a two-way meter switch S, during modulation, in which position it will give only the reduced value of E$u$. If this has changed it can be restored to its calibration level.

If in practice, E$u$ is for example 100 volts, then for 100% modulation E$m$ becomes 200 volts. Further if the 100 volts point on the meter scale is considered zero volts modulation, the voltage registered under modulation is given directly as a percentage increase, and so on for intermediate values.

A switch may be provided in the HFC to partition off the first rectifier V¹ from the load resistance R for the application of low-frequency alternating voltages (D.C. polarised or otherwise) to the second rectifier V².

If the injection is unpolarised then the meter M will read the R.M.S. value on position 1 of its switch S and the peak value on position 2;

Polarising by means of a suitable value of direct voltage will simulate the standardising steady voltage given in the high frequency case giving similar results.

Figure 5:
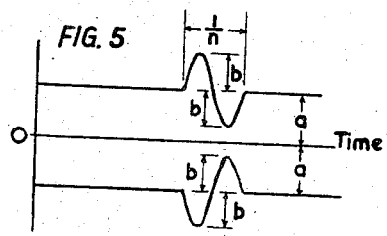
Fig. 5 is a curve illustrating the positive and negative values of a modulated wave.
Figure 6:
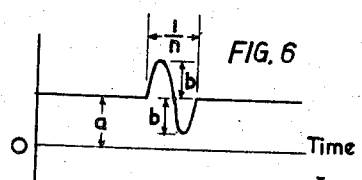
Fig. 6 is a curve illustrating the voltage across resistance R.

To recapitulate, at P' there exists, relative to ground and earth line E, an instantaneous negative voltage of $a$ and $-b$ where as shown in Figures 5 and 6, $a$ represents the peak value of the unmodulated high frequency carrier after rectification by rectifier V¹. It remains always the mean value of the pulse voltage and, therefore, constant. When the value of $b$ is zero, the potential of the point P' is a steady value and is measured by meter M either between P' and earth via switch S contact 1 or 2. The reason for this is that, owing to the constant nature of such potential difference, rectifier V² is not actuated and so the potential of the point P' (all figures) is at the earth line.

However, when some value of $b$ is present in the modulation voltage, meter M via switch S contact 1 to earth, will still read only the steady constant value $a$ and will not indicate any variations above and below the mean value.

The variations of this modulation voltage (or varying unidirectional voltage) are applied to the second rectifier V² (all figures) and there rectified according to well recognized methods when using a diode rectifier. Each varying voltage above and below the previous mean voltage is rectified in this second rectifier and at point P produces, according to the peak value above its mean (which is the value $b$) a unidirectional voltage above or below the earth line potential, the polarity of which is determined by the inverting switch SR of the rectifier V².

There thus exists between P' and earth line a voltage equal to $a$ and constant, while between P and earth there exists a constant voltage equal to $b$. These two voltages, being D.C., are series additive and consequently are measured by the voltmeter M via switch S².

It should be understood that the switch S is not essential. The meter M may be permanently wired between P' and P. Without modulation, V² is not activated and the meter will read the peak value of the carrier envelope. When the carrier is non-existent or should fall below the previously calibrated means, then such would be indicated by the meter M. When the carrier disappears, the meter reads zero.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device for producing a signal indicative of the percentage of modulation of a carrier input signal comprising: signal input terminals; means including a first rectifier connected to said input terminals to be responsive to said input signal for producing a first direct voltage signal across the first rectifier load resistance proportional to the amplitude of said carrier input signal; means including a second rectifier connected to said input terminals to be responsive to said input signal for producing a second direct voltage signal across the second rectifier load resistance proportional to the amplitude of the carrier modulating voltage of said applied carrier signal; the first direct voltage signal and the second direct voltage signal being of opposite polarities relative to a point of common reference potential to which one terminal of each load resistance is connected; and an electrostatic voltmeter connected across the other terminals of said resistors for producing an indication of the sum of the magnitudes of said first and second signals.

2. The device as defined in claim 1 wherein said means for producing a second direct voltage signal includes a resistance and capacitor connected to form a parallel circuit, and means for connecting said parallel circuit to the negative electrode of said rectifier.

3. The device as defined in claim 1 wherein said means for producing a second direct voltage signal includes three resistances together with switching means for selecting two of said three resistances to be operatively connected in said device, said switching means being effective to reverse the polarity of said second direct voltage relative to the polarity of said first direct voltage.

4. The device as defined in claim 3 wherein one of said three resistances is operatively connected in said device in either of two positions of said switching means, and the other two of said resistances are of equal value.

5. The device as defined in claim 4 wherein the second direct voltage signal is produced across said one of the three resistances.

References Cited in the file of this patent

UNITED STATES PATENTS

| | | |
|---|---|---|
| 2,012,291 | Tuttle | Aug. 27, 1935 |
| 2,069,934 | Arguimbau | Feb. 9, 1937 |
| 2,149,451 | Lent | Mar. 7, 1939 |
| 2,362,830 | Kline | Nov. 14, 1944 |
| 2,522,914 | Winchel et al. | Sept. 19, 1950 |
| 2,708,736 | Creveling et al. | May 17, 1955 |
| 2,745,062 | Medicus | May 8, 1956 |
| 2,780,780 | Lahti | Feb. 5, 1957 |